March 12, 1929. S. L. HEDBERG 1,705,404
FAUCET
Filed Nov. 15, 1926
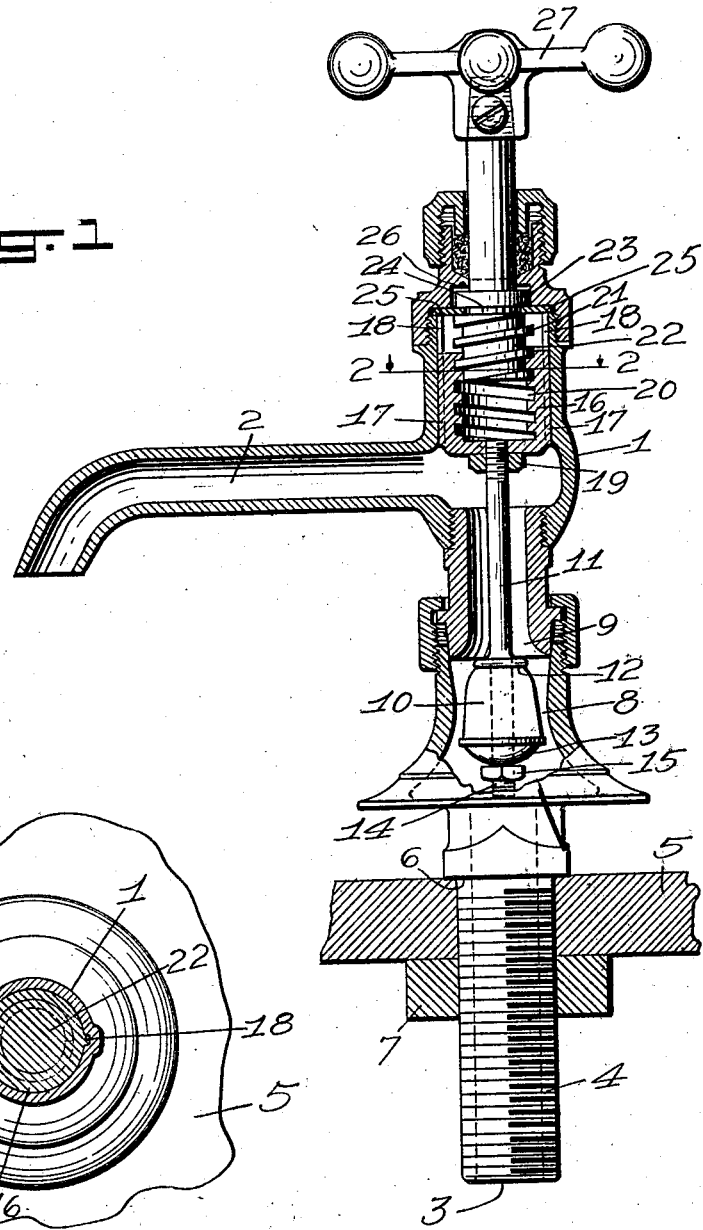
INVENTOR
S. L. HEDBERG
BY
ATTORNEYS Patented Mar. 12, 1929.

1,705,404

UNITED STATES PATENT OFFICE.

SAMUEL LARS HEDBERG, OF CHICAGO, ILLINOIS.

FAUCET.

Application filed November 15, 1926. Serial No. 148,478.

My invention relates to improvements in faucets, and it consists in the combinations, constructions, and arrangements herein described and claimed.

An object of my invention is to provide a faucet in which the rubber valve is moved toward or away from the valve seat, and in which a novel means is employed for preventing the rotation of the valve.

A further object of my invention is to provide a device of the type described in which the valve is held rigidly against lateral movement for preventing hammering or vibrating of the valve.

A further object of my invention is to provide a device of the type described in which the valve may be held firmly in any desired position.

A further object of my invention is to provide a device of the type described which prevents wear upon the valve as occurs in rotating valves, thus making the life of the valve permanent.

A further object of my invention is to provide a device of the type described in which the inlet opening may be larger for enabling liquid to pass therethrough at a more rapid rate of speed.

A further object of my invention is to provide a device of the type described which is simple in construction, durable and efficient for the purpose intended, and will not get out of order easily.

Other objects and advantages will appear in the following specification, and the novel features of the invention will be particularly pointed out in the appended claim.

My invention is illustrated in the accompanying drawings, forming part of this application, in which Figure 1 is a side elevation of the device, portions thereof being shown in section, and Figure 2 is a section along the line 2—2 of Figure 1.

In carrying out my invention, I provide a body portion 1 having an outlet 2 and an inlet 3. The inlet 3 is provided with a threaded portion 4 which is adapted to pass through an opening in any desired support indicated at 5. A shoulder 6 is provided which rests upon the support 5 as the device is locked in place by a lock nut 7 which is disposed upon the threaded portion 4.

A valve compartment 8 is provided in the inlet 3. A valve seat 9 is disposed adjacent the valve compartment 8. A valve 10 constructed of any suitable material, such as rubber, is disposed upon a valve stem 11 adjacent an annular shoulder 12. A metal cup-shaped member 13 is disposed concentric with the valve stem 11 adjacent the valve 10. The lower end of the valve stem 11 is threaded at 14 and upon which an adjusting nut 15 is disposed.

A slidable female member 16 is disposed in the upper part of the body portion 1 and provided with tongue portions 17 which are slidably disposed in grooves 18, the grooves 18 being vertically disposed in the walls of the body portion. The valve stem 11 is adjustably secured to the bottom portion of the slidable female member 16 and is locked in adjusted position by a lock nut 19. The slidable member 16 is provided with internal threads 20 which are adapted to receive threads 21 of a male member 22. The male member 22 is provided with a shoulder 23 which is spaced a slight distance away from the ends of the threads 21, thus providing an annular recess 24. A split washer 25 is disposed concentric with the male member 22, the inner peripheral edge of the washer being disposed in the recess 24 and the outer peripheral edge of the washer being disposed upon the upper extremity of the body portion 1. The washer 25 is rigidly held in place by a packing gland 26. The free end of the male member 22 extends upwardly through the packing gland 26 and is provided with a hand wheel 27.

From the foregoing description of the various parts of the device, the operation thereof may be readily understood. The inlet 3 is secured to a water supply in the usual manner. The flow of the liquid through the outlet 2 is controlled by movement of the valve 10 toward and away from the valve seat 9. This is done by rotation of the male member 22. If the male member 22 is rotated in a clockwise direction (looking down upon the device) the threads of the male member engage with the threads of the female slidable member 16 and cause the female member, together with the valve 10, to move upwardly. In this movement, the valve 10 is moved into engagement with the valve seat 9. It will be observed that the movement of the valve 10 is directly upwardly and downwardly, but not rotating. If the male member is rotated in a counter-clockwise direction (looking down upon the device) the valve 10 is moved downwardly out of engagement with the valve seat 9.

The slidable female member firmly holds the valve 10 against lateral movement, irrespective of the position of the valve with respect to the valve seat 9. The valve stem may be moved inwardly or outwardly with respect to the slidable female member 16, thus varying the position of the valve 10 with respect to the valve seat 9.

I claim:

A device of the type described comprising a body portion having vertically disposed grooves in the inner walls thereof, a slidable member disposed in said body portion and having tongue portions receivable in said grooves, an inlet and an outlet having a relatively large passageway therebetween, a valve seat in said inlet, a valve disposed in said inlet and adapted to be moved into engagement with said valve seat, a relatively small valve stem centrally disposed in said passageway, said valve disposed upon one end of said valve stem, adjustable means for varying the position of said valve with respect to said valve seat, means for locking said valve stem in adjusted position, and means for moving said slidable member, said valve stem and said valve, whereby said tongue portions will be moved within said grooves.

SAMUEL LARS HEDBERG.